M. M. HAFF & T. L. WILLSON.
METHOD OF DRYING AND ENRICHING PHOSPHATE MATERIAL AND THE LIKE.
APPLICATION FILED OCT. 19, 1912.
1,161,473.
Patented Nov. 23, 1915.
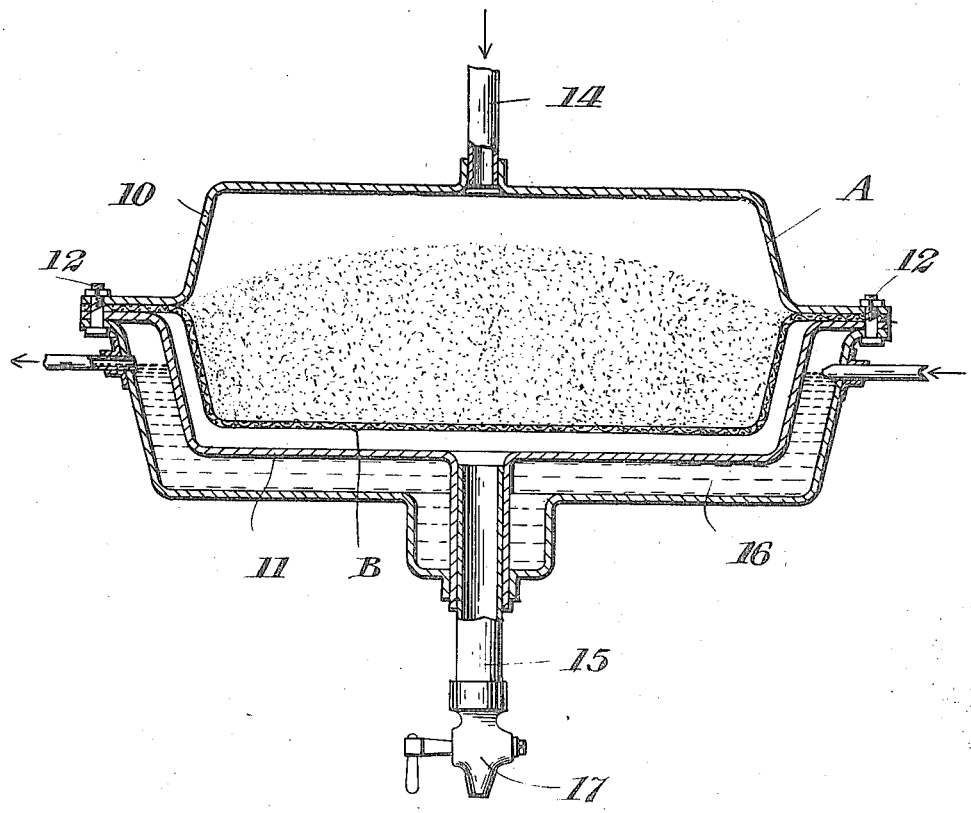

UNITED STATES PATENT OFFICE.

MAXIMILIAN MATTHEUS HAFF AND THOMAS LEOPOLD WILLSON, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

METHOD OF DRYING AND ENRICHING PHOSPHATE MATERIAL AND THE LIKE.

1,161,473. Specification of Letters Patent. Patented Nov. 23, 1915.

Application filed October 19, 1912. Serial No. 726,744.

*To all whom it may concern:*

Be it known that we, MAXIMILIAN MATTHEUS HAFF and THOMAS LEOPOLD WILLSON, of the city of Ottawa, Province of Ontario, Dominion of Canada, have invented certain new and useful Improvements in Methods of Drying and Enriching Phosphate Material and the like, of which the following is the specification.

This invention relates to an improved method of drying phosphate material and the objects are to effectually carry away all excess moisture, to render the drying uniform throughout the mass, to prevent channeling of the mass through surface condensation, to prevent condensation of any moisture on the surface and generally to improve the drying operation.

In United States Patent 1,040,081, dated October 1st, 1912, we have described a method of drying monocalcic phosphate by the introduction of ammonia gas therein. We have discovered that the drying operation is much improved by the circulation of air through the mass of phosphate either with the ammonia or subsequent to the introduction thereof. We have also discovered that if the air is passed in the same direction as the attraction of gravity, that is to say in a downward direction, improved results are obtained, in that surface condensation is prevented and channeling of the mixture by dripping of moisture on the sides prevented.

The operation may be further facilitated by cooling the bottom of the mixture. Details of the process are however set forth in the accompanying specification and drawing.

The drawing shows a sectional view through an apparatus which may be used to carry out the invention.

Referring to the drawing, A represents a container for the material to be treated which may be, for example monocalcic phosphate. The container is preferably formed in two halves 10 and 11 meeting in a horizontal plane and detachably connected together as by bolts 12. The ammonia and air are introduced through the inlet 14 at the top and the air with any suspended water vapor is withdrawn through the outlet 15 in the bottom.

To cause condensation of the water vapor from the air after it has passed through the phosphate it is brought into contact with a cool surface and this may be accomplished by providing a water jacket 16 about the underside of the container through which cold water or other cooling medium is circulated, the water condensed passing out through the outlet 15. It is desirable that the phosphate material itself should be kept out of contact with the cooling surface and this is accomplished by providing a basket B of woven wire or foraminous material which will support the underside of the phosphate material in the container a short distance out of contact with the under-surface of the container which is being cooled.

In the practical operation of the process the monocalcic phosphate to be treated is placed in the container and substantially equal parts of ammonia gas and air are forced into the container, a continuous and uniform pressure being maintained in the container. We have found that a pressure of five pounds per square inch is sufficient for this purpose. The air is drawn off continuously but sufficiently slowly to cause all the ammonia to be absorbed, regulation being effected through a suitable valve 17. The air in passing through the mixture in the container picks up any excess moisture therein and being brought into contact with the cooled lower surface of the container will cause such moisture to be partially condensed and this result will be obtained without the moisture channeling or otherwise affecting the phosphate material.

It is important that the gas should be introduced and the ammonia passed in a downward direction as otherwise the condensation would take place on the surface of the container and drop back upon the mass decomposing it and it would be difficult to eliminate this and prevent moisture ultimately remaining in the mass. If desired the ammonia gas might be first introduced and then the air passed through, but we prefer to introduce them together as the air carries away the moisture liberated by the heat of the reaction between the ammonia with the phosphate. The mixture of the ammonia gas with the air may be accomplished in any suitable way, as through the medium of an injector. The maintenance of a pressure in the container during the operation prevents channeling of the material.

It will be apparent that the functions of the air might be readily performed by any other inactive gas. The air if desired may be specially heated or dried, or both heated and dried prior to introduction.

It may be observed that the introduction of the ammonia into the phosphate material enriches it in the sense of rendering it more valuable as a fertilizer.

It will be observed that the phosphate material being in a loose mass the downward current of air tends to pack the material and prevent channeling whereas an upward current would lift the material and form channels.

What we claim as our invention is:

1. The herein described method of drying and enriching a phosphate material which comprises introducing ammonia gas and air therein.

2. The herein described method of drying and enriching a phosphate material which comprises introducing ammonia gas and air therein under pressure.

3. The herein described method of drying and enriching a phosphate material which comprises placing the material in a closed container and introducing ammonia gas and air under pressure.

4. The herein described method of drying and enriching a phosphate which comprises passing ammonia and air therethrough in a direction the same as the attraction of the force of gravity.

In witness whereof we have hereunto set our hands in the presence of two witnesses.

MAXIMILIAN MATTHEUS HAFF.
THOMAS LEOPOLD WILLSON.

Witnesses:
　RUSSEL S. SMART,
　M. MAHONEY.